(12) United States Patent
Jin et al.

(10) Patent No.: US 12,433,832 B2
(45) Date of Patent: Oct. 7, 2025

(54) AQUEOUS MIXTURES COMPRISING CELLULOSE NANOCRYSTALS AND SULFONATED POLYESTER

(71) Applicant: North Carolina State University, Raleigh, NC (US)

(72) Inventors: Soo Ah Jin, Raleigh, NC (US); Emily Facchine, Raleigh, NC (US); Saad A. Khan, Raleigh, NC (US); Orlando Rojas, Raleigh, NC (US); Richard J. Spontak, Raleigh, NC (US); Koushik Ghosh, Kingsport, TN (US)

(73) Assignee: North Carolina State University, Raleigh, NC (US)

( * ) Notice: Subject to any disclaimer, the term of this patent is extended or adjusted under 35 U.S.C. 154(b) by 704 days.

(21) Appl. No.: 17/777,925

(22) PCT Filed: Nov. 18, 2020

(86) PCT No.: PCT/US2020/061048
§ 371 (c)(1),
(2) Date: May 18, 2022

(87) PCT Pub. No.: WO2021/101989
PCT Pub. Date: May 27, 2021

(65) Prior Publication Data
US 2023/0038792 A1 Feb. 9, 2023

Related U.S. Application Data

(60) Provisional application No. 62/936,842, filed on Nov. 18, 2019.

(51) Int. Cl.
*A61K 8/73* (2006.01)
*A61K 8/67* (2006.01)
*A61K 8/85* (2006.01)
*A61Q 1/06* (2006.01)
*A61Q 1/10* (2006.01)

(52) U.S. Cl.
CPC ............... *A61K 8/731* (2013.01); *A61K 8/67* (2013.01); *A61K 8/85* (2013.01); *A61Q 1/06* (2013.01); *A61Q 1/10* (2013.01); *A61K 2800/43* (2013.01)

(58) Field of Classification Search
None
See application file for complete search history.

(56) References Cited

U.S. PATENT DOCUMENTS

| | | |
|---|---|---|
| 3,018,272 A | 1/1962 | Griffing et al. |
| 3,528,947 A | 9/1970 | Lappin |
| 3,779,993 A | 12/1973 | Kibler et al. |
| 4,304,901 A | 12/1981 | O'Neill et al. |
| RE34,716 E | 9/1994 | Vishnupad et al. |
| 5,369,211 A | 11/1994 | George et al. |
| 6,162,890 A | 12/2000 | George et al. |
| 6,171,685 B1 | 1/2001 | George et al. |
| 6,428,900 B1 | 8/2002 | Wang |
| 7,902,094 B2 | 3/2011 | Haile et al. |
| 7,923,526 B2 | 4/2011 | Oldfield et al. |
| 8,512,519 B2 | 8/2013 | Gupta et al. |
| 8,580,872 B2 | 11/2013 | Kuo et al. |
| 11,278,475 B2 * | 3/2022 | Truniger .................. D21C 5/00 |
| 2005/0044642 A1 | 3/2005 | Butcher |
| 2006/0058438 A1 | 3/2006 | Williams et al. |
| 2007/0258935 A1 * | 11/2007 | McEntire ............. A61K 9/7015 |
| | | 424/758 |
| 2009/0123767 A1 | 5/2009 | Gohl et al. |
| 2013/0023604 A1 | 1/2013 | Kuo et al. |
| 2014/0357789 A1 | 12/2014 | George et al. |
| 2015/0175820 A1 | 6/2015 | Breton et al. |
| 2015/0265519 A1 * | 9/2015 | Bui ...................... A61K 8/8147 |
| | | 424/70.7 |
| 2016/0051460 A1 * | 2/2016 | Ebanks .................... A61Q 1/10 |
| | | 424/70.7 |
| 2016/0168443 A1 | 6/2016 | Lafitte et al. |
| 2017/0174980 A1 | 6/2017 | Ladva et al. |
| 2019/0008749 A1 * | 1/2019 | Harris .................... A61Q 17/04 |
| 2020/0330356 A1 * | 10/2020 | Guariloff ............. A61Q 19/08 |

FOREIGN PATENT DOCUMENTS

| | | |
|---|---|---|
| CN | 106188633 B | 8/2018 |
| JP | 2012051991 A | 3/2012 |
| JP | 2017043647 A | 3/2017 |

(Continued)

OTHER PUBLICATIONS

Landry et al. "Nanocrystalline Cellulose: Morphological, Physical and Mechanical Properties" 2011.*
Peng et al. "Chemistry and Applications of Nanocrystalline Cellulose and Its Derivatives: A Nanotechnology Perspective" 2011.*
Eastman AQ water-dispersible film formers.*
Peng et al. "Chemistry and Applications of Nanocrystalline Cellulose and Its Derivatives: A Nanotechnology Perspective" 2011.*
Eastman AQ water-dispersible film formers.*

(Continued)

*Primary Examiner* — Danah Al-Awadi
(74) *Attorney, Agent, or Firm* — Michael Best & Friedrich LLP

(57) ABSTRACT

Aqueous mixtures can include cellulose nanocrystals and sulfonated polyester, where a glass transition temperature ($T_g$) of the sulfonated polyester is greater than 25° C. In some instances, exemplary aqueous mixtures also include one or more additives, such as pigment. Exemplary aqueous mixtures can be applied as a film that is typically hydrophobic and resilient against water at room temperature. Upon application of warm water, such as at temperatures of from about 30° C. to about 60° C., the film can be removed with no or limited abrasion and/or with no or little removal oils.

17 Claims, 11 Drawing Sheets

(56) References Cited

FOREIGN PATENT DOCUMENTS

| JP | 2018070835 | A  | 5/2018 |
|----|------------|----|--------|
| JP | 2020055898 | A  | 4/2020 |
| WO | 2006028680 | A1 | 3/2006 |
| WO | 2017080734 | A1 | 5/2017 |
| WO | 2018012643 | A1 | 1/2018 |
| WO | 2018182721 | A1 | 10/2018 |

OTHER PUBLICATIONS

Abd El-Fattah et al., "Nanocrystalline Cellulose as an Eco-Friendly Reinforcing Additive to Polyurethane Coating for Augmented Anticorrosive Behavior", Carbohydr. Polym., 2018, vol. 183, pp. 311-318.
Agoda-Tandjawa et al., "Rheological Characterization of Microfibrillated Cellulose Suspensions after Freezing", Carbohydr. Polym., 2010, vol. 3, No. 80, pp. 677-686.
Arya et al., "Log-Rolling Micelles in Sheared Amphiphillic Thin Films", Phys. Rev. Lett., 2005, vol. 95, No. 18, 188301.
Azzam et al., "Tunable Aggregation and Gelation of Thermoresponsive Suspensions of Polymer-Grafted Cellulose Nanocrystals", Biomacromolecules, 2016, vol. 17, No. 6, pp. 2112-2119.
Bjorkman, "Floc Dynamics in Flowing Fibre Suspensions", Nord. Pulp Pap. Res. J., 2005, vol. 20, No. 2, pp. 247-252.
Burns et al., "Nanodiamond Gels in Nonpolar Media: Colloidal and Rheological Properties", J. Rheol., 2014, vol. 58, No. 5, pp. 1599-1614.
Cheng et al., "A Time-Dependent Property and How to Measure It", Rheol. Acta, 1986, vol. 25, No. 5, pp. 542-554.
Chinga-Carrasco, "Cellulose fibres, Nanofibrils and Microfibrils: The Morphological Sequence of MFC Components from a Plant Physiology and Fibre Technology Point of View", Nanoscale Res. Lett., 2011, vol. 6, No. 417, pp. 1-7.
Derakhshandeh et al., "Ageing, Yielding, and Rheology of Nanocrystalline Celluose Suspensions", J. Rheol., 2013, vol. 57, No. 1, pp. 131-148.
Derakhshandeh et al., "Rheology of Pulp Fibre Suspensions: A Critical Review", Chem. Eng. Sci., 2011, vol. 66, No. 15, pp. 3460-3470.
Deshmukh et al., "Biopolymer Composites with High Dielectric Performance: Interface Engineering", Biopolymer Composites in Electronics, Chapter 3, 2017, pp. 27-37.
Dimic-Misic et al., "Micro- and Nanofibrillated Cellulose as a Rheology Modifier Additive in CMC-Containing Pigment-Coating Formulations", Ind. Eng. Chem. Res., 2013, vol. 52, No. 45, pp. 16066-16083.
Fall et al., "Yield Stress and Shear Banding in Granular Suspensions", Phys. Rev. Lett., 2009, vol. 103, No. 17, 178301.
Frisoni et al., "Natural Cellulose Fibers: Heterogeneous Acetylation Kinetics and Biodegradation Behavior", Biomacromolecules, 2001, vol. 2, No. 2, pp. 476-482.
Fukuzumi et al., "Transparent and High Gas Barrier Films of Cellulose Nanofibers Prepared by TEMPO-Mediated Oxidation", Biomacromolecules, 2009, vol. 10, pp. 162-165.
Geng et al., "Chapter 6 Rheological Properties of Jute-Based Cellulose Nanofibers under Different Ionic Conditions", ACS, 2017, vol. 1251, pp. 113-132.
Hill et al., "Elastic Modulus of Microfibrillar Cellulose Gels", Biomacromolecules, 2008, vol. 9, pp. 2963-2966.
Hyun et al., "A Review of Nonlinear Oscillatory Shear Tests: Analysis and Application of Large Amplitude Oscillatory Shear (LAOS)", Prog. Polym. Sci., 2011, vol. 36, No. 12, pp. 1697-1753.
Hyun et al., "Large Amplitude Oscillatory Shear as a Way to Classify the Complex Fluids", J. Non-Newton. Fluid Mech., 2002, vol. 107, No. 1, pp. 51-65.
Ilzhoefer et al., "Evidence of Hierarchical Order in an Amphiphillic Graft Terolymer Gel", J. Phys. Chem., 1995, vol. 99, No. 32, pp. 12069-12071.
International Preliminary Report on Patentability for Application No. PCT/US20/31621 dated Nov. 2, 2021 (5 pages).
International Search Report and Written Opinion for Application No. PCT/US20/31621 dated Jul. 31, 2020 (12 pages).
International Search Report and Written Opinion for Application No. PCT/US20/61048 dated Feb. 17, 2021 (12 pages).
Iotti et al., "Rheological Studies of Microfibrillar Cellulose Water Dispersions", J. Polym. Environ., 2011, vol. 19, pp. 137-145.
Isogai et al., "TEMPO-Oxidized Cellulose Nanofibers", Nanoscale, 2011, vol. 3, pp. 71-85.
Iwamoto et al., "Relationship between Aspect Ratio and Suspension Viscosity of Wood Cellulose Nanofibers", Polym. J., 2014, vol. 46, No. 1, pp. 73-76.
Karppinen et al., "Flocculation of Microfibrillated Cellulose in Shear Flow", Cellulose, 2019, 2012, vol. 19, No. 6, pp. 1807-1819.
Kaur et al., "Dispersion of Nanomaterials in Aqueous Media: Towards Protocol Optimization", J. Vis. Exp, 2017, vol. 130, e56074, 23 pages.
Klemm et al., "Nanocellulose as a Natural Source for Groundbreaking Applications in Materials Science: Today's State", Mater. Tody, 2018, vol. 21, No. 7, pp. 720-748.
Koumakis et al., "Two Step Yielding in Attractive Colloids: Transition from Gels to Attractive Glasses", Soft Matter, 2011, vol. 7, pp. 2456-2470.
Lasseuguette et al., "Rheological Properties of Microfibrillar Suspension of TEMPO-Oxidized Pulp", Cellulose, 2008, vol. 15, No. 3, pp. 425-433.
Le et al., "Effect of Lignin on the Morphology and Rheological Properties of Nanofibrillated Cellulose Produced from gamma-Valerolactone/Water Fractionation Process", Cellulose, 2018, vol. 25, No. 1, pp. 179-194.
Martoia et al., "Micro-Mechanics of Electrostatically Stabilized Suspensions of Cellulose Nanofibrils under Steady State Shear Flow", Soft Matter, 2016, vol. 12, No. 6, pp. 1721-1735.
Martoia et al., "On the Origins of the Elasticity of Cellulose Nanofiber Nanocomposites and Nanopapers: A Micromechanical Approach", RSC Adv., 2016, vol. 6, No. 53, pp. 47258-47271.
Mason et al., "Elasticity of Compressed Emulsions", Phys. Rev. Lett., 1995, vol. 75, No. 10, pp. 2051-5054.
Moghimi et al., "Colloidal Gels Tuned by Oscillatory Shear", Soft Matter, 2017, vol. 13, No. 12, pp. 2371-2383.
Moon et al., "Cellulose Nanomaterials Review: Structure, Properties and Nanocomposites", Chem. Soc. Rev., 2011, vol. 40, No. 7, pp. 3941-3994.
Nazari et al., "Rheology of Cellulose Nanofibers Suspensions: Boundary Driven Flow", J. Rheol. 1978-Present, 2016, vol. 60, No. 6, pp. 1151-1159.
Nechyporchuk et al., "Current Progress in Rheology of Cellulose Nanofibril Suspensions", Biomacromolecules, 2016, vol. 17, No. 7, pp. 2311-2320.
Nechyporchuk et al., "Rheological Properties of Micro-/Nanofibrillated Cellulose Suspensions: Wall-Slip and Shear Banding Phenomena", Carbohydr. Polmy., 2014, vol. 112, pp. 432-439.
Okita et al., "TEMPO-Oxidized Cellulose Nanofibrils Dispersed in Organic Solvents", Biomacromolecules, 2011, vol. 12, No. 2, pp. 518-522.
Paakko et al., "Enzymatic-Hydrolysis Combined with Mechanical Shearing and High-Pressure Homogenization for Nanoscale Cellulose Fibrils and Strong Gels", Biomacromolecules, 2007, vol. 8, No. 6, pp. 1934-1941.
Petekidis et al., "Rearrangements in Hard-Sphere Glasses Under Oscillatory Shear Strain", Phys. Rev. E, 2002, vol. 66, No. 5, 051402.
Puisto et al., "Modeling the Rheology of Nanocelluose Suspensions", Nord. Pulp Pap. Res. J., 2012, vol. 27, No. 2, pp. 277-281.
Raghavan et al., "Shear-induced Microstructural Changes in Flocculated Suspensions of Fumed Silica", J. Rheol., 1995, vol. 39, No. 6, pp. 1311-1325.
Reiner et al., "Chapter 12 Experiences with Scaling-Up Production of TEMPO-Grade Cellulose Nanofibrils", ACS, 2017, vol. 1251, pp. 227-245.
Saarikoski et al., "Flocculated Flow of Microfibrillated Cellulose Water Suspensions: An Imaging Approach for Characterisation of Rheological Behavior", Cellulose, 2012, vol. 19, No. 3, pp. 647-659.

(56) References Cited

OTHER PUBLICATIONS

Saarinen et al., "The Effect of Wall Depletion on the Rheology of Microfibrillated Cellulose Water Suspensions by Optical Coherence Tomography", Cellulose, 2014, vol. 21, No. 3, pp. 1261-1275.
Saito et al., "Cellulose Nanofibers Prepared by TEMPO-Mediated Oxidation of Native Cellulose", Biomacromolecules, 2007, vol. 8, No. 8, pp. 2485-2491.
Tao et al., "Brownian Dynamics Simulations of the Self- and Collective Rotational Diffusion Coefficients of Rigid Long Thin Rods", J. Chem. Phys., 2005, vol. 122, No. 24, 244903.
Walls et al., "Yield Stress and Wall Slip Phenomena in Colloidal Silica Gels", J. Rheol., 2003, vol. 47, No. 4, pp. 847-868.
Wei et al., "Environmental Science and Engineering Applications of Nanocellulose-Based Nanocomposites", Env. Sci Nano, 2014, vol. 1. No. 4, pp. 302-316.
Xiang et al., "How Cellulose Nanofibrils Affect Bulk, Surface, and Foam Properties of Anionic Surfactant Solutions", Biomacromolecules, 2019, vol. 20, No. 12, pp. 4361-4369.
Xiang et al., "Surface Activity and Foaming Capacity of Aggregates Formed between an Anionic Surfactant and Non-Cellulosics Leached from Wood Fibers", Biomacromolecules, 2019, vol. 20, No. 6, pp. 2286-2294.
Xu et al., "Decoupling Arrest Origins in Hydrogels of Cellulose Nanofibrils", ACS Omega, 2018, vol. 3, pp. 1564-1571.
Yang et al., "Some Rheological Measurements on Magnetic Iron Oxide Suspensions in Silicone Oil", J. Rheol, 1986, vol. 30, No. 5, pp. 1015-1029.
Zhang et al., "Cellulose Nanofibrils: From Strong Materials to Bioactive Surfaces", J. Renew. Mater., 2013, vol. 1, No. 3, pp. 195-211.
European Patent Office Extended European Search Report for application 20801503.2, dated Jan. 4, 2023, 7 pages.

* cited by examiner

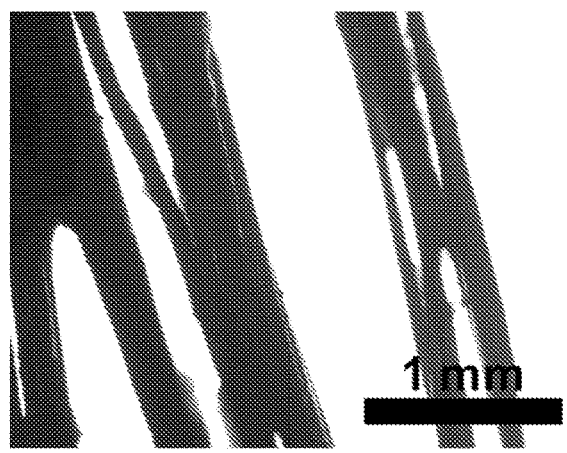 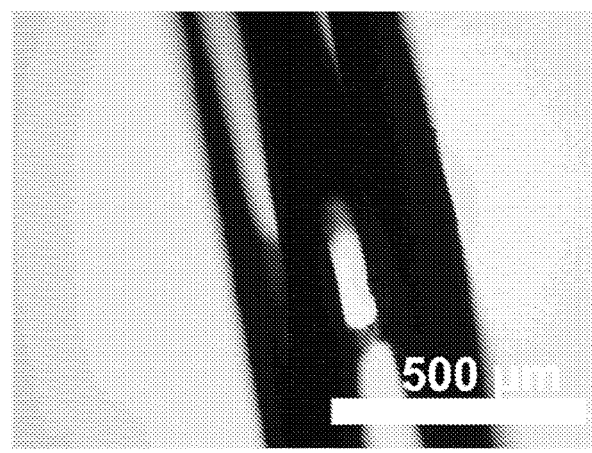
*FIG. 6A*            *FIG. 6B*
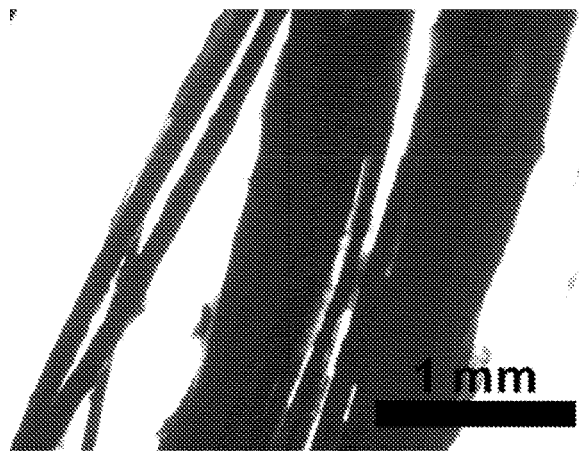 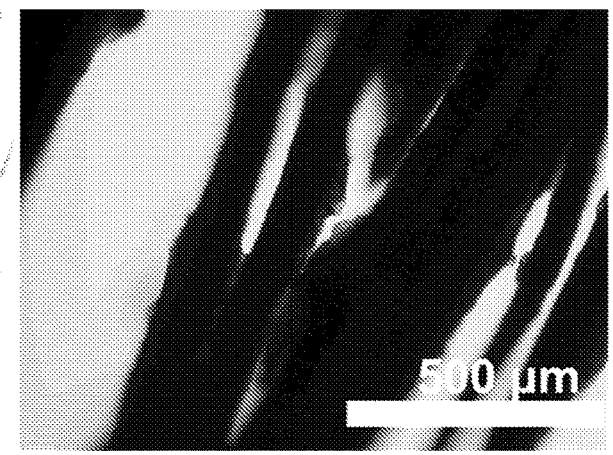
*FIG. 6C*            *FIG. 6D*

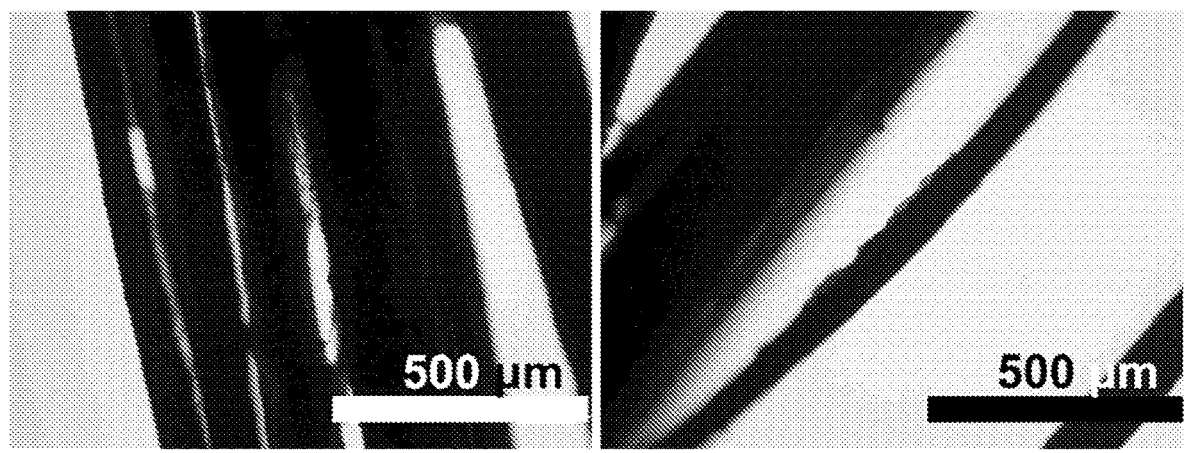
*FIG. 7A*  *FIG. 7B*

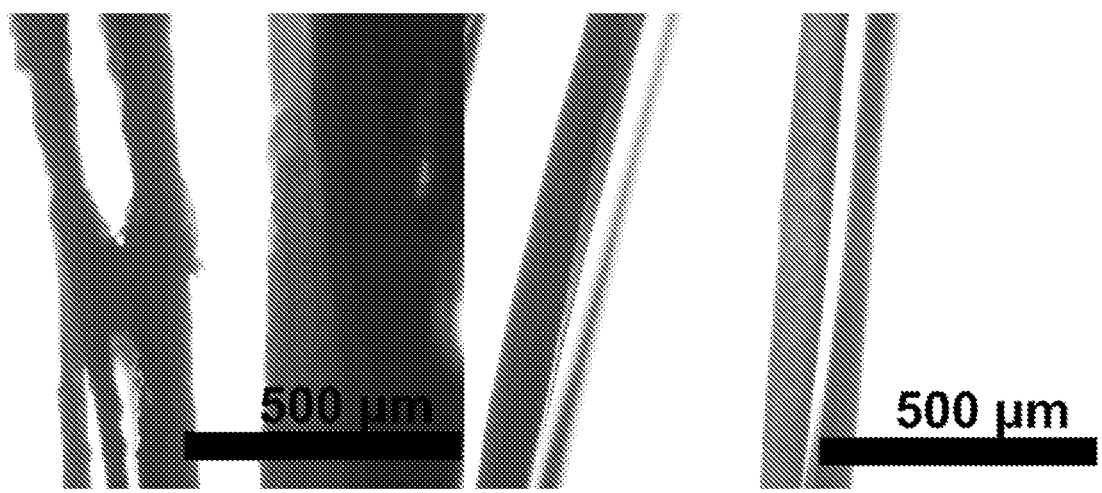
*FIG. 8A*        *FIG. 8B*

AQUEOUS MIXTURES COMPRISING CELLULOSE NANOCRYSTALS AND SULFONATED POLYESTER

CROSS-REFERENCE TO RELATED APPLICATIONS

The present application is a U.S. national stage entry of International Patent Application No. PCT/US2020/061048, filed on Nov. 18, 2020, which is related to and claims the priority benefit of U.S. Provisional Patent Application No. 62/936,842, filed on Nov. 18, 2019, the entire contents of each of which are fully incorporated herein by reference.

TECHNICAL FIELD

The present disclosure relates to systems and methods for making aqueous mixtures. More specifically, systems and methods disclosed and contemplated herein involve aqueous mixtures including cellulose nanocrystals and sulfonated polyester.

INTRODUCTION

Removal of conventional film-forming personal care products can involve excessive mechanical abrasion, which can cause discomfort and damage or irritate the skin. In some instances, removal of such products can involve the use of special oil-based removal products or wipes, which can add expense to the consumer, yield additional solid waste and/or involve applying additional chemical substances to the face or body.

SUMMARY

In one aspect, an aqueous mixture is disclosed. The aqueous mixture can include cellulose nanocrystals and sulfonated polyester, wherein the glass transition temperature ($T_g$) of the sulfonated polyester is greater than 25° C.

In another aspect, a method for making an aqueous mixture is disclosed. The method can include combining sulfonated polyester and cellulose nanocrystals to form the aqueous mixture.

There is no specific requirement that a material, technique or method relating to aqueous mixtures include all of the details characterized herein to obtain some benefit according to the present disclosure. Thus, the specific examples characterized herein are meant to be exemplary applications of the techniques described, and alternatives are possible.

BRIEF DESCRIPTION OF THE DRAWINGS

FIG. 6A-FIG. 6D are optical microscopy images of fake eyelashes coated with exemplary aqueous mixtures before and after, respectively, abrasion testing.

FIGS. 7A and 7B are optical microscopy images of false eyelashes coated with exemplary aqueous mixtures before and after, respectively, exposure to water.

FIGS. 8A and 8B are optical microscopy images of false eyelashes coated with exemplary aqueous mixtures before and after, respectively, exposure to warm water.

DETAILED DESCRIPTION

Figure 1:
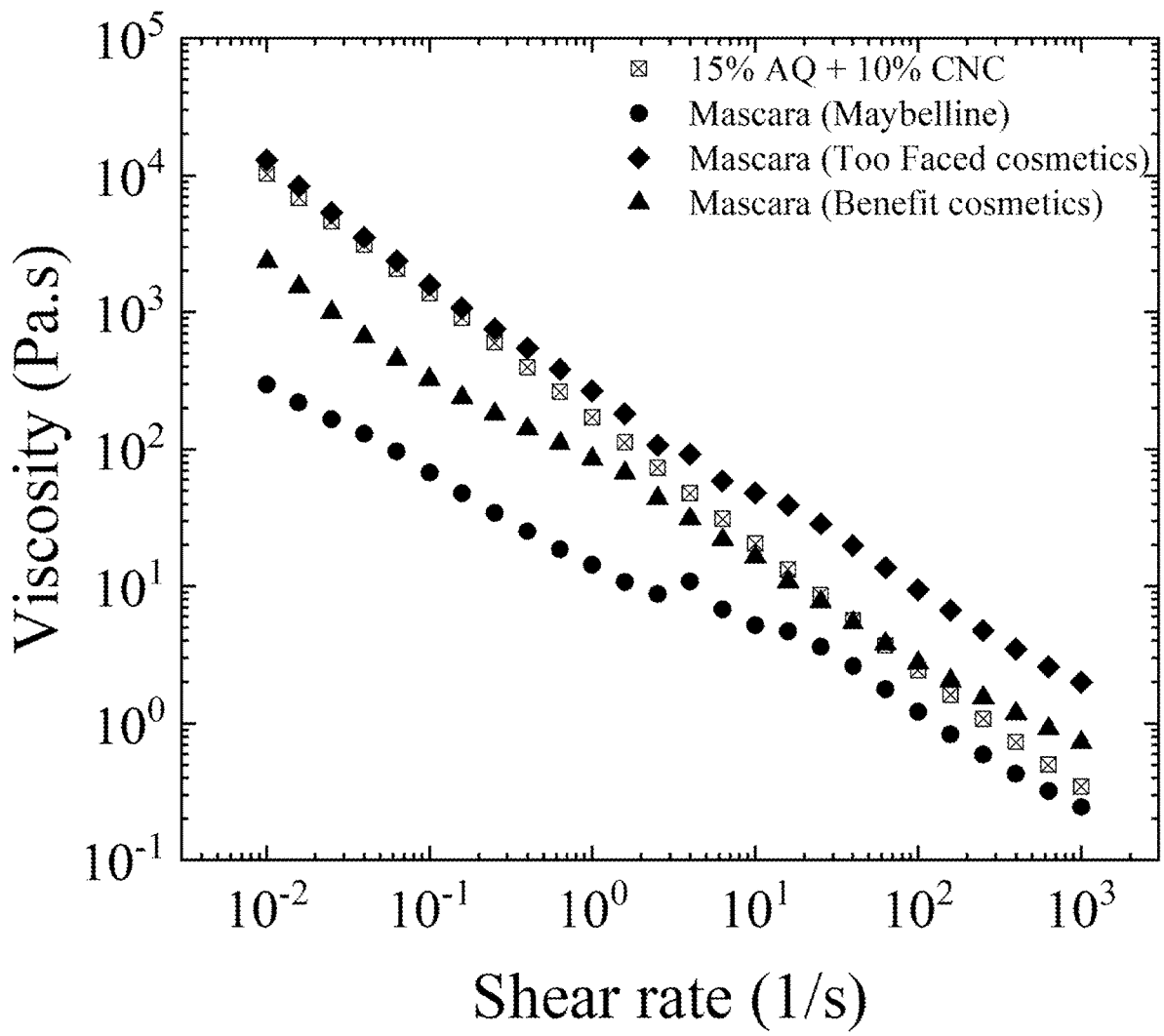
FIG. 1 shows experimental data for viscosity of an example aqueous mixture and commercially available mascaras at selected shear rates.

Systems and methods disclosed and contemplated herein relate to aqueous mixtures. Exemplary aqueous mixtures are designed to replace existing petroleum-based products. Broadly characterized, exemplary aqueous mixtures can be applied as a film that is typically hydrophobic and resilient against water at room temperature. Upon application of warm water, such as at temperatures ranging from about 30° C. to about 60° C., the film can be removed with no or limited abrasion and/or with no or little removal oils. These and other aspects of exemplary aqueous mixtures are particularly suited for short-term application products, such as cosmetics.

Generally, example aqueous mixtures disclosed and contemplated herein include cellulose nanocrystals and sulfonated polyester, wherein the glass transition temperature ($T_g$) of the sulfonated polyester is greater than 25° C. In some instances, exemplary aqueous mixtures also include one or more application-specific additives, such as pigment.

Typically, exemplary mixtures include suspended cellulose nanocrystals and dispersed sulfonated polyester in the presence of water. Without being bound by a particular theoretical explanation, the cellulose nanocrystals act as a thickening agent and stabilizer for potential additional components, and the sulfonated polyester provides a polymer base aimed at improving application and removal of the aqueous mixture. In contrast to many existing additives, cellulose nanocrystals have relatively low environmental impact.

Definitions

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The modifiers "about" or "approximately" used in connection with a quantity are inclusive of the stated value and has the meaning dictated by the context (for example, it includes at least the degree of error associated with the measurement of the particular quantity). These modifiers should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Example Aqueous Mixtures

Example aqueous mixtures disclosed and contemplated herein are water-based and typically include cellulose nanocrystals and sulfonated polyester. Exemplary aqueous mixtures may be suspensions. In various implementations, example aqueous mixtures can include additional components. The sections below discuss various aspects of exemplary aqueous mixtures.

Example Cellulose Nanocrystals

Exemplary cellulose nanocrystals (CNCs) act as thickeners in aqueous mixtures disclosed and are contemplated herein. CNCs are stiff rod-like particles made from unmodified or modified (e.g., carboxylated, sulfonated) cellulose, wherein the CNC includes cellulose chain segments in a nearly perfect crystalline structure. It has been observed that exemplary CNCs mix better and improve dispersibility in aqueous mixtures with sulfonated polyester, as compared to conventional natural thickening agents such as gum Arabic and Senegal gum.

In some implementations, the cellulose nanocrystals are hydrolyzed and referred to as hydrolyzed cellulose nanocrystals. In some implementations, the CNCs are in the sodium form. Cellulose nanocrystals are distinguished from micro/nanofibrillated cellulose (MNFC) and from cellulose nanofibrils (CNFs).

MNFC is prepared by mechanical defibrillation, has dimensions on the order of 10 µm by 10-100 nm (length by width), has about 50% crystallinity, and has negligible surface charges. MNFC has repeating units of:

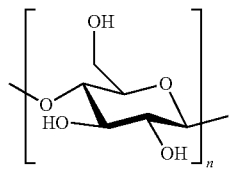

CNFs are prepared by TEMPO-mediated oxidation, have dimensions on the order of 1 µm by 10 nm (length by width), have about 50% crystallinity, and have strong surface charges owing to carboxylate groups. CNF have repeating units of:

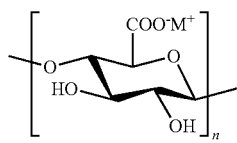

In the diagram above, M+ may be a monovalent cation. Exemplary monovalent cations include, without limitation, Na$^+$, K$^+$, and Li$^+$.

CNC can be obtained using methods known in the art, such as acid hydrolysis, for instance, by sulfuric acid hydrolysis. CNC can be prepared from various starting materials, such as wood, cotton, flax, hemp, bamboo, marine animals, fungi, algae, rami, sisal, straw, palm, sugar beet pulp, and industrial and crop wastes.

CNCs have dimensions on the order of about 100 nm by 10 nm (length by width). For instance, exemplary CNCs can have average lengths of about 100 nm to about 200 nm; about 150 nm to about 200 nm; about 100 nm to about 150 nm; or about 175 nm to about 200 nm. In some embodiments, the CNCs may have an average length of at least 100 nm, at least 125 nm, at least 150 nm, or at least 175 nm, or less than 200 nm, less than 175 nm, or less than 150 nm. Exemplary CNCs can have average widths of about 5 nm to 20 nm; about 5 nm to about 10 nm; about 10 nm to about 20 nm; about 8 nm to about 17 nm; and about 10 nm to about 15 nm. In some embodiments, the CNCs may have an average width of greater than 5 nm, greater than 8 nm, or greater than 10, or less than 20 nm, less than 17 nm, or less than 15 nm. CNCs have crystallinity levels on the order of about 90% and have strong surface charges owing to the presence of sulfate groups.

In some instances, CNCs used in exemplary aqueous solutions have anionic surface charges that may be associated with a counterion such as sodium. In other instances, CNCs used in exemplary aqueous solutions have nonionic surfaces. Exemplary anionic CNC can include surfaces functionalized with sulfate groups. For instance, surfaces of exemplary CNC can include sulfate half-ester groups, such as:

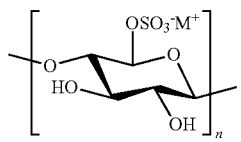

In the diagram above, M+ may be a monovalent cation. Exemplary monovalent cations include, without limitation, Na+, K+, and Li+. In some implementations, the CNC surface charge density is about 0.3 meq/g, as measured by conductometric titration.

In some instances, CNC can be provided in gel form (e.g., about 12 wt %) or in dry powder form (e.g., about 98 wt %). In some instances, CNC in dry form has a density of about 1.0 g/cm³ and CNC in dry powder form has a density of about 1.5 g/cm³. Exemplary CNC can be commercially obtained from sources such as, but not limited to, the Forest Products Laboratory (Madison, Wisconsin).

Example Sulfonated Polyesters

Sulfonated polyester used in exemplary aqueous mixtures provide film-forming properties to the mixtures. As used herein, the term "polyester" includes polymers that are "homopolyesters" and "copolyesters." As used herein, the terms "sulfopolyester" and "sulfonated polyester" generally refer to polyesters containing one or more ionic sulfonate ($SO_3^-$) groups.

Sulfopolyester polymers are linear, amorphous polyesters that can be dispersed in polar media, such as water, without the assistance of surfactants or other hydrophilic species such as amines. This polar media dispersibility can be attributed to the ionic nature of the sulfonate substituents attached to the polymer chains. Example sulfonated polyesters can also aid in the dispersion of hydrophobic ingredients in aqueous media.

Exemplary water-dispersible sulfopolyester used in accordance with the present disclosure is prepared from monomer residues comprising dicarboxylic acid monomer residues, sulfomonomer residues, and diol monomer residues. The sulfomonomer may be a dicarboxylic acid, a diol, or hydroxycarboxylic acid. Thus, the term "monomer residue," as used herein, means a residue of a dicarboxylic acid, a diol, or a hydroxycarboxylic acid. A "repeating unit" or "repeat unit," as used herein, means an organic structure having 2 monomer residues bonded through a carbonyloxy group. The sulfopolyesters for use with the present disclosure contain approximately equal molar proportions of acid residues (100 mole %) and diol residues (100 mole %) which react in approximately equal proportions such that the total moles of repeating units are equal to 100 mole %.

In one embodiment or in combination with any of the mentioned embodiments, the sulfomonomer residue comprises a salt of a sulfoisophthalate moiety derived, for example, from sodiosulfoisophthalic acid (5-SSIPA), dimethyl 5-sodiosulfoisophthalate, or esters thereof. The sulfoisophthalate moiety can also be derived from other metallic sulfoisophthalic acids and esters thereof. For example, the associated metal M is a monovalent cation, such as Na+, Li+, or K+.

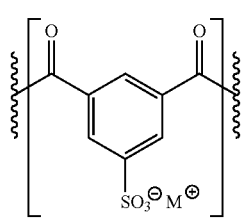

Salt of a Sulfoisophthalate Moiety

In addition to the sulfoisophthalate moiety, the sulfopolymer can include the residues of one or more of a glycol monomer, a dicarboxylic acid monomer, and/or a diamine monomer. Examples of sulfopolymers include sulfopolyester, sulfopolyamide, and sulfopolyesteramide.

In one embodiment or in combination with any of the mentioned embodiments, the sulfopolyesters described herein comprise the following structural formula:

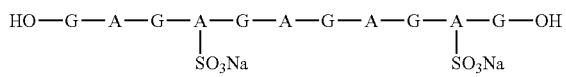

wherein A is a dicarboxylic acid repeat unit and G is a glycol repeat unit. Examples of dicarboxylic acid repeat units A include but are not limited to terephthalic acid, isophthalic acid and/or 1,4-cyclohexane dicarboxylic acid (1,4-CHDA). Examples of glycol repeat units G include but are not limited to ethylene glycol (EG), Diethylene glycol (DEG), triethylene glycol (TEG), neopentyl glycol (NPG), and/or 1,4-cyclohexane dimethanol (CHDM). The following are illustrative monomer residues:

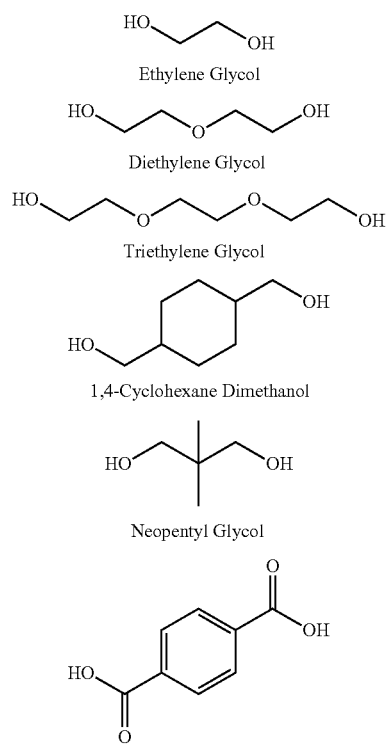

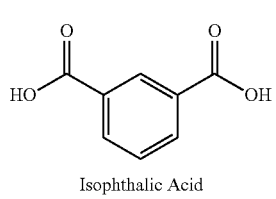

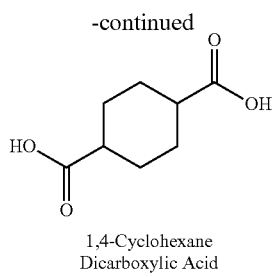

1,4-Cyclohexane
Dicarboxylic Acid

In one embodiment or in combination with any of the mentioned embodiments, the sulfopolymer can be a linear polymer having an average molecular weight (MW) of at least 2 kDa. In one embodiment or in combination with any of the mentioned embodiments, the sulfopolymer has an average MW of 2-15 kDa, 4-15 kDa, 5-15 kDa, 5-12 kDa, or 7-10 kDa.

The sulfopolyesters described herein have an inherent viscosity, abbreviated hereinafter as "Ih.V.", of at least 0.1 dL/g, for instance at least 0.2, at least 0.3 dL/g, or at least 0.4 dL/g, and at most 0.5 dL/g, measured in a 60/40 parts by weight solution of phenol/tetrachloroethane solvent at 20° C. and at a concentration of 0.5 g of sulfopolyester in 100 mL of solvent.

Exemplary sulfonated polyesters have a glass transition temperature, $T_g$, greater than 25° C. The glass transition temperature ($T_g$) is the temperature where a glassy polymer becomes molten/rubbery on heating, and vice versa upon cooling. In various implementations, the sulfonated polyester has a glass transition temperature, $T_g$, ranging from 30° C. to 120° C.; from 30° C. to 100° C.; from 40° C. to 90° C.; from 40° C. to 80° C.; from 50° C. to 70° C.; from 35° C. to 65° C.; from 40° C. to 60° C.; from 35° C. to 55° C.; from 40° C. to 50° C.; from 45° C. to 60° C.; from 35° C. to 45° C.; from 50° C. to 65° C.; from 50° C. to 55° C.; from 35° C. to 40° C.; from 45° C. to 50° C.; or from 55° C. to 65° C. In some embodiments, the sulfonated polyesters may have a $T_g$ of greater than 35° C., greater than 40° C., greater than 45° C., greater than 50° C., or greater than 55° C., or less than 60° C., less than 55° C., less than 50° C., less than 45° C., or less than 40° C.

In general, sulfopolymer dispersions, and particularly aqueous dispersions of sulfopolyesters, will have a pH that is neutral to mildly acidic, for instance in the range of 5-7.5. Specific example sulfopolymers will have a pH of between 5.5 and 7, or between 5.8 and 6.8, or between 6.0 and 6.6, or between 5.8 and 6.5.

The mole percentages provided in the present disclosure may be based on the total moles of acid residues, the total moles of diol residues, or the total moles of repeating units. For example, a sulfopolyester containing 30 mole % of a sulfomonomer, which may be a dicarboxylic acid, a diol, or hydroxycarboxylic acid, based on the total repeating units, means that there are 30 moles of sulfomonomer residues among every 100 moles of repeating units. Similarly, a sulfopolyester containing 30 mole % of a dicarboxylic acid sulfomonomer including a sulfoisophthalic moiety, based on the total acid residues, means the sulfopolyester contains 30 moles of sulfomonomer residues among every 100 moles of acid residues.

The sulfopolyesters described herein have an inherent viscosity, abbreviated hereinafter as "Ih.V.," of at least 0.1 dL/g, for instance at least 0.2 dL/g, at least 0.3 dL/g, or at least 0.4 dL/g, and at most 0.5 dL/g, measured in a 60/40 parts by weight solution of phenol/tetrachloroethane solvent at 20° C. and at a concentration of 0.5 g of sulfopolyester in 100 mL of solvent. The term "polyester," as used herein, encompasses both "homopolyesters" and "copolyesters" and means a synthetic polymer prepared by the polycondensation of difunctional carboxylic acids with a difunctional hydroxyl compound. As used herein, the term "sulfopolyester" means any polyester comprising a sulfomonomer including a sulfoisophthalic moiety. Typically, the difunctional carboxylic acid is a dicarboxylic acid and the difunctional hydroxyl compound is a dihydric alcohol such as, for example, glycols and diols. Alternatively, sulfopolyester contains hydroxy acid monomers, for example, p-hydroxybenzoic acid, and the difunctional hydroxyl compound may be an aromatic nucleus bearing 2 hydroxy substituents such as, for example, hydroquinone. The term "residue," as used herein, means any organic structure incorporated into the polymer through a polycondensation reaction involving the corresponding monomer. Thus, the dicarboxylic acid residue may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The sulfopolyester of the present disclosure includes one or more dicarboxylic acid residues. Depending on the type and concentration of the sulfomonomer, the dicarboxylic acid residue may comprise from 60 mole % to 100 mole % of the acid residues. Other examples of concentration ranges of dicarboxylic acid residues are from 60 mole % to 95 mole %, and 70 mole % to 95 mole %. Examples of dicarboxylic acids that may be used include aliphatic dicarboxylic acids, alicyclic dicarboxylic acids, aromatic dicarboxylic acids, or mixtures of two or more of these acids. Thus, suitable dicarboxylic acids include succinic; glutaric; adipic; azelaic; sebacic; fumaric; maleic; itaconic; 1,3-cyclohexanedicarboxylic; 1,4 cyclohexanedicarboxylic; diglycolic; 2,5-norbornanedicarboxylic; phthalic; terephthalic; 1,4-naphthalenedicarboxylic; 2,6-naphthalenedicarboxylic; diphenic; 4,4'-oxydibenzoic; 4,4'-sulfonyidibenzoic; and isophthalic. Example dicarboxylic acid residues are isophthalic, terephthalic, and 1,4-cyclohexanedicarboxylic acids, or if diesters are used, dimethyl terephthalate, dimethyl isophthalate, and dimethyl-1,4-cyclohexane-dicarboxylate with the residues of isophthalic and terephthalic acid being exemplary. The dicarboxylic acid methyl ester is a specific example embodiment; it is also acceptable to include higher order alkyl esters, such as ethyl, propyl, isopropyl, butyl, and so forth. In addition, aromatic esters, particularly phenyl, also may be employed.

The sulfopolyester includes 4 mole % to 40 mole %, based on the total repeating units, of residues of at least one sulfomonomer having two functional groups and one or more sulfonate groups attached to an aromatic or cycloaliphatic ring wherein the functional groups are hydroxyl, carboxyl, or a combination thereof. Additional examples of concentration ranges for the sulfomonomer residues are 4 mole % to 35 mole %, 8 mole % to 30 mole %, and 8 mole % to 25 mole %, based on the total repeating units. The sulfomonomer may be a dicarboxylic acid or ester thereof containing a sulfonate group, a diol containing a sulfonate group, or a hydroxy acid containing a sulfonate group. The term "sulfonate" refers to the anion of a sulfonic acid having the structure "—$SO_3$," and the term "sulfonate salt" is the salt of a sulfonic acid having the structure "—SO₃M" wherein M is the cation of the sulfonate salt. The cation of the sulfonate salt may be a metal ion such as Li⁺, Na⁺, K⁺, and the like. Alternatively, the cation of the sulfonate salt may be non-metallic such as a nitrogenous base as described, for example, in U.S. Pat. No. 4,304,901. Nitrogen-based cations are derived from nitrogen-containing bases, which may be aliphatic, cycloaliphatic, or aromatic compounds. Examples of such nitrogen containing bases include ammonia, dimethylethanolamine, diethanolamine, triethanolamine, pyridine, morpholine, and piperidine. Because monomers containing the nitrogen-based sulfonate salts typically are not thermally stable at conditions required to make the polymers in the melt, the method of this disclosure for preparing sulfopolyesters containing nitrogen-based sulfonate salt groups is to disperse, dissipate, or dissolve the polymer containing the required amount of sulfonate group in the form of its alkali metal salt in water and then exchange the alkali metal cation for a nitrogen-based cation.

When a monovalent alkali metal ion is used as the cation of the sulfonate salt, the resulting sulfopolyester is completely dispersible in water with the rate of dispersion dependent on the content of sulfomonomer in the polymer, temperature of the water, surface area/thickness of the sulfopolyester, and so forth. When a divalent metal ion is used, the resulting sulfopolyesters are not readily dispersed by cold water but are more easily dispersed by hot water. Utilization of more than one counterion within a single polymer composition is possible and may offer a means to tailor or fine-tune the water-responsivity of the resulting article of manufacture. Examples of sulfomonomer residues include monomer residues where the sulfonate salt group is attached to an aromatic or alicyclic dicarboxylic acid or residues thereof, such as, for example dicarboxylic acids or residues derived from the following, benzene; naphthalene; diphenyl; oxydiphenyl; sulfonyldiphenyl; and methylenediphenyl or cycloaliphatic rings, such as, for example, cyclohexyl; cyclopentyl; cyclobutyl; cycloheptyl; and cyclooctyl. Other examples of sulfomonomer residues which may be used in the present disclosure are the metal sulfonate salt of sulfophthalic acid, sulfoterephthalic acid, sulfoisophthalic acid, or combinations thereof. Other examples of sulfomonomers which may be used are 5-sodiosulfoisophthalic acid and esters thereof. If the sulfomonomer residue is from 5-sodiosulfoisophthalic acid, typical sulfomonomer concentration ranges are 4 mole % to 35 mole %, 8 mole % to 30 mole %, and about 8 mole % to 25 mole %, based on the total moles of acid residues.

The sulfomonomers used in the preparation of the sulfopolyesters are known compounds and may be prepared using methods well known in the art. For example, sulfomonomers in which the sulfonate group is attached to an aromatic ring may be prepared by sulfonating the aromatic compound with oleum to obtain the corresponding sulfonic acid and followed by reaction with a metal oxide or base, for example, sodium acetate, to prepare the sulfonate salt. Procedures for preparation of various sulfomonomers are described, for example, in U.S. Pat. Nos. 3,779,993; 3,018,272; and 3,528,947.

It is also possible to prepare the polyester using, for example, a sodium sulfonate salt, and ion-exchange methods to replace the sodium with a different ion, such as zinc, when the polymer is in the dispersed form. This type of ion exchange procedure is generally superior to preparing the polymer with divalent salts insofar as the sodium salts are usually more soluble in the polymer reactant melt-phase.

The sulfopolyester includes one or more diol residues which may include aliphatic, alicyclic, and/or aralkyl glycols. Examples include ethylene glycol, diethylene glycol, triethylene glycol, polyethylene glycols, and polyalkylene glycols. Other suitable glycols include cycloaliphatic glycols having 6 to 20 carbon atoms and aliphatic glycols having 3 to 20 carbon atoms. Specific examples of such glycols are ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, diethanol, 2,2,4-trimethyl-1,6-hexanedio-1 thiodiethanol, 1,2-cyclohexanedimethanol, 1,3-cyclohexanedimethanol, 1,4-cyclohexanedimethanol, 2,2,4,4-tetra-methyl-1,3-cyclobutanediol, and p-xylylenediol. The sulfopolyester can also comprise a mixture of glycols.

Diols also includes polyfunctional alcohols (polyols). Examples of polyols include neopentyl glycol; butylene glycol; 1,4-butanediol, hexylene glycol; 1,6-hexanediol; the polyglycols such as diethylene glycol or triethylene glycol and the like; the triols such as glycerine, trimetylol ethane, trimethylol propane and the like; and other higher functional alcohols such as pentaerythritol, sorbitol, mannitol, and the like.

The diol residues may include from 25 mole % to 100 mole %, based on the total diol residues, residues of a poly(ethylene glycol) having a structure

H—(OCH₂—CH₂)n—OH wherein n is an integer in the range of 2 to 500. Non-limiting examples of lower molecular weight polyethylene glycols, e.g., wherein n is from 2 to 6, are diethylene glycol, triethylene glycol, and tetraethylene glycol. Of these lower molecular weight glycols, diethylene, and triethylene glycol are exemplars. Higher molecular weight polyethylene glycols (abbreviated herein as "PEG"), wherein n is from 7 to 500, include, but are not limited to, the commercially available products known under the designation CARBO-WAX®, a product of Dow Chemical Company (formerly Union Carbide). Typically, PEGs are used in combination with other diols such as, for example, diethylene glycol or ethylene glycol. Based on the values of n, which range from greater than 7 to 500, the molecular weight may range from greater than 300 to 22,000 g/mol. The molecular weight and the mole % are inversely proportional to each other; specifically, as the molecular weight is increased, the mole % will be decreased in order to achieve a designated degree of hydrophilicity. For example, it is illustrative of this concept to consider that a PEG having a molecular weight of 1000 g/mol may constitute up to 10 mole % of the total diol, while a PEG having a molecular weight of 10,000 g/mol would typically be incorporated at a level of less than 1 mole % of the total diol.

Certain dimer, trimer, and tetramer diols may be formed in situ due to side reactions that may be controlled by varying the process conditions. For example, varying amounts of diethylene, triethylene, and tetraethylene glycols may be formed from ethylene glycol from an acid-catalyzed dehydration reaction which occurs readily when the polycondensation reaction is conducted under acidic conditions. The presence of buffer solutions, well-known to those skilled in the art, may be added to the reaction mixture to retard these side reactions. Additional compositional latitude is possible, however, if the buffer is omitted and the dimerization, trimerization, and tetramerization reactions are allowed to proceed.

The sulfopolyester of the present disclosure may include from 0 mole % to 25 mole %, based on the total repeating units, of residues of a branching monomer having 3 or more functional groups wherein the functional groups are hydroxyl, carboxyl, or a combination thereof. Non-limiting examples of branching monomers are 1,1,1-trimethylol propane, 1,1,1-trimethylolethane, glycerin, pentaerythritol, erythritol, threitol, dipentaerythritol, sorbitol, trimellitic anhydride, pyromellitic dianhydride, dimethylol propionic acid, or combinations thereof. Further examples of branching monomer concentration ranges are from 0 mole % to 20 mole % and from 0 mole % to 10 mole %. The presence of a branching monomer may result in a number of possible benefits to the sulfopolyester of the present disclosure such as the ability to tailor rheological, solubility, and tensile properties. For example, at a constant molecular weight, a branched sulfopolyester, compared to a linear analog, will also have a greater concentration of end groups that may facilitate post-polymerization crosslinking reactions. At high concentrations of branching agent, however, the sulfopolyester may be prone to gelation.

An exemplary sulfonated polyester chemical structure is provided below.

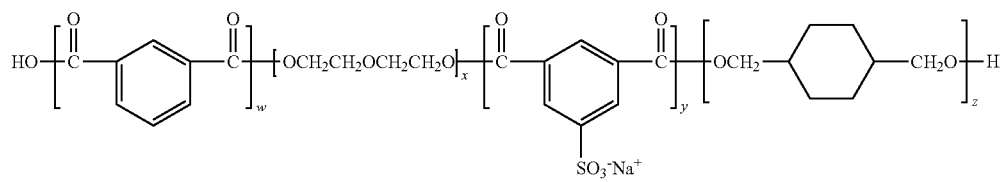

Examples of commercially-available sulfonated polyesters include Eastman AQ™ 55S polymer, Eastman AQ™ 38S polymer, and Eastman AQ™ 48 Ultra polymer available from the Eastman Chemical Company (Kingsport, Tennessee). Other sulfonated polyesters are contemplated.

Eastman AQ™ 55S polymer has, on average, the following properties: a glass transition temperature of 51-55° C., an inherent viscosity of 0.29-0.37 dL/g, an acid number less than 2 mg KOH/g, a hydroxyl number less than 10 mg KOH/g, and a bulk density of 814.8 kg/m³ (6.8 lb/gal).

Eastman AQ™ 38S polymer has, on average, the following properties: a glass transition temperature of 35-38° C., an inherent viscosity of 0.32-0.40 dL/g, an acid number less than 2 mg KOH/g, a hydroxyl number less than 10 mg KOH/g, and a bulk density of 778.9 kg/m³ (6.5 lb/gal).

Eastman AQ™ 48 Ultra polymer has, on average, the following properties: a glass transition temperature of 45-48° C., an inherent viscosity of 0.26-0.32 dL/g, an acid number less than 2 mg KOH/g, a hydroxyl number less than 10 mg KOH/g, and a bulk density of 826.8 kg/m³ (6.9 lb/gal).

Additional sulfonated polyesters are disclosed and described in the following documents, each of which is hereby incorporated by reference in its entirety: U.S. Pat. No. 8,580,872, "Sulfopolyester polymer compositions with improved water dispersibility"; United States Pre-Grant Publication No. 2014/0357789, "Sulfopolyester having a charge density greater than one and products made therefrom"; U.S. Pat. No. 7,923,526, "Sulfopolyesters having improved clarity in water-dispersible formulations and products made therefrom"; U.S. Pat. No. 5,369,211, "Water-dispersible sulfopolyester compositions having a $T_g$ of greater than 89° C."; U.S. Pat. No. 6,171,685, "Water-dispersible films and fibers based on sulfopolyesters"; U.S. Pat. No. 7,902,094, "Water-dispersible and multicomponent fibers from sulfopolyesters"; and U.S. Pat. No. 6,162,890, "Water-dispersible block copolyesters useful as low-odor adhesive raw materials".

Example Additives

Exemplary aqueous mixtures may comprise one or more additives. Exemplary additives include health-related compounds such as vitamins or pharmaceutical agents, reinforcement particles, and/or pigment particles. Exemplary pigment particles can include carbon black, FeO, ZnO, SnO, or $TiO_2$.

Example Amounts of Aqueous Mixture Components

Components in exemplary aqueous mixtures disclosed and contemplated herein may be present in various amounts. Cellulose nanocrystals (CNCs) can be present in the aqueous mixtures at from about 5 wt % to about 20 wt %. In various implementations, cellulose nanocrystals can be present in the aqueous mixtures at about 5.0 wt % to about 18.0 wt %; about 7.0 wt % to about 13.0 wt %; about 8.0 wt % to about 15.0 wt %; about 9.0 wt % to about 14.0 wt %; about 8.0 wt % to about 19.0 wt %; about 5.0 wt % to 15.0 wt %; about 5.0 wt % to about 10.0 wt %; about 5.0 wt % to about 11.0 wt %; about 5.0 wt % to 7.0 wt %; about 7.0 wt % to about 10.0 wt %; or about 10.0 wt % to about 17.0 wt %. In various implementations, cellulose nanocrystals can be present in the aqueous mixtures in an amount that is no less than 5 wt %; no less than 7 wt %; no less than 10 wt %; no less than 12 wt %; no less than 15 wt %; or no less than 17 wt %. In various implementations, cellulose nanocrystals can be present in the aqueous mixtures in an amount that is no more than 20 wt %; no more than 16 wt %; no more than 15 wt %; no more than 11 wt %; no more than 8 wt %; or no more than 6 wt %.

Sulfonated polyester can be present in example aqueous mixtures at from about 1.0 wt % to about 30.0 wt %. In various implementations, sulfonated polyester can be present in the aqueous mixtures at about 1.0 wt % to about 25.0 wt %; about 2.0 wt % to about 24.0 wt %; about 5.0 wt % to about 20.0 wt %; about 5.0 wt % to about 15.0 wt %; about 8.0 wt % to about 12.0 wt %; about 1.0 wt % to about 10.0 wt %; about 10.0 wt % to about 25.0 wt %; about 15.0 wt % to about 29.0 wt %; about 3.0 wt % to about 9.0 wt %; about 20.0 wt % to about 25.0 wt %; or about 0.5 wt % to about 5.0%. In various implementations, sulfonated polyester can be present in the aqueous mixtures in an amount that is no less than 2 wt %; no less than 4 wt %; no less than 8 wt %; no less than 10 wt %; no less than 12 wt %; no less than 16 wt %; no less than 20 wt %; or no less than 24 wt %. In various implementations, sulfonated polyester can be present in the aqueous mixtures in an amount no more than 30 wt %; no more than 25 wt %; no more than 21 wt %; no more than 17 wt %; no more than 13 wt %; no more than 9 wt %; no more than 5 wt %; or no more than 2 wt %.

Exemplary aqueous mixtures can include various relative amounts of sulfonated polyester and cellulose nanocrystals. For instance, exemplary aqueous mixtures can include about 5 wt % CNC and about 25 wt % sulfonated polyester; about 7 wt % CNC and about 20 wt % sulfonated polyester; about 7 wt % CNC and about 25 wt % sulfonated polyester; about 10 wt % CNC and about 15 wt % sulfonated polyester; about 10 wt % CNC and about 20 wt % sulfonated polyester; about 10 wt % CNC and about 25 wt % sulfonated polyester; about 6 wt % CNC and about 15 wt % sulfonated polyester; about 8 wt % CNC and about 10 wt % sulfonated polyester.

In various implementations, reinforcement particles and/or pigment particles may be present in exemplary aqueous mixtures at about 0.1 wt % to about 3.0 wt %; about 1.0 wt % to about 2.5 wt %; about 1.5 wt % to about 2.5 wt %; about 1.75 wt % to about 2.25 wt %; or about 2.0 wt %. In various implementations, reinforcement particles and/or pigment particles may be present in the aqueous mixtures at no less than 0.1 wt %; no less than 0.5 wt %; no less than 1.0 wt %; no less than 1.5 wt %; no less than 2.0 wt %; no less than 2.5 wt %; or no less than 2.75 wt %. In various implementations, reinforcement particles and/or pigment particles may be present in the aqueous mixtures at no more than 3.0 wt %; no more than 2.5 wt %; no more than 2.0 wt %; no more than 1.5 wt %; no more than 1.0 wt %; no more than 0.5 wt %; or no more than 0.25 wt %. In various implementations, vitamins and/or pharmaceutical agents may be present in exemplary aqueous mixtures at suitable amounts.

Example Properties

Example aqueous mixtures disclosed and contemplated herein have various ranges of physical and chemical properties. Techniques described herein can be used to selectively adjust those physical properties depending upon a use or application of the aqueous mixture.

Exemplary aqueous mixtures can be applied as a film that is typically hydrophobic and resilient against water at room temperature. Upon application of warm water, such as at temperatures of from about 30° C. to about 60° C. (depending on the $T_g$ of the sulfonated polyester), the film can be removed with no or limited abrasion and/or with no or little removal oils.

Example Methods of Manufacture

Example methods for making aqueous mixtures disclosed and contemplated herein can include one or more operations. An example method includes combining sulfonated polyester and cellulose nanocrystals in an aqueous medium.

In some instances, the sulfonated polyester is mixed in the aqueous medium first (that is, without adding cellulose nanocrystals simultaneously). Alternatively, sulfonated polyester may be obtained in dispersed form.

Mixing the sulfonated polyester in the aqueous medium can include heating the mixture and agitating. Heating and/or agitation may be performed until a stable dispersion is obtained. In some instances, a stable dispersion may be obtained when a zeta potential of the dispersion is less than 30 mV. Temperatures and mixing times can be selected to avoid affecting the properties of the resultant solution, which identifies a single-phase mixture.

In some instances, the mixture is heated to about or at least 25° C.; about or at least 30° C.; about or at least 35° C.; about or at least 40° C.; about or at least 45° C.; about or at least 50° C.; about or at least 55° C.; about or at least 60° C.; about or at least 65° C.; about or at least 70° C.; about or at least 75° C.; about or at least 80° C.; or about or at least 85° C.

Agitation can include stirring, hand stirring, shaking or sonication for a predetermined amount of time, such as about or at least 30 minutes; about or at least 45 minutes; about or at least 60 minutes; about or at least 75 minutes; about or at least 90 minutes; about or at least 120 minutes; or about or at least 180 minutes. In some instances, agitation with sonication includes the use of an ice bath.

Next, cellulose nanocrystals can be added to the mixture, typically accompanied by agitation of the mixture. In some instances, cellulose nanocrystals are gradually added to the mixture. In some instances, during and/or after addition of the cellulose nanocrystals, the mixture can be heated such that the composition temperature is about or at least 45° C.; about or at least 50° C.; about or at least 55° C.; about or at least 60° C.; or about or at least 65° C. Temperatures and mixing times can be selected to avoid adversely affecting the properties of the resultant suspension, which identifies a well-dispersed mixture.

Amounts of sulfonated polyester and cellulose nanocrystals can be determined such that sulfonated polyester is present in the aqueous mixture at no more than about 30 wt %, and cellulose nanocrystals is present in the aqueous mixture at no less than about 5 wt % and no more than 20 wt %. Other possible amounts of sulfonated polyester and cellulose nanocrystals in the aqueous mixtures are provided above.

After combining sulfonated polyester and cellulose nanocrystals in the aqueous medium, one or more additives can be introduced into the mixture. Exemplary additives include health-related compounds such as vitamins or pharmaceutical agents, reinforcement particles, and/or pigment particles. Exemplary pigment particles can include carbon black, FeO, ZnO, SnO, or $TiO_2$. Exemplary amounts of additive in various aqueous mixtures are provided above.

Exemplary Implementations

Typically, after preparing the aqueous mixtures including sulfonated polyester and cellulose nanocrystals, the aqueous mixture can be used in a variety of applications. For instance, exemplary aqueous mixtures can be used in personal care, cosmetics, or household products. As examples, aqueous mixtures can be used as a formulation in mascaras, hair colorants/fixatives, lip color products, facial foundation, liquid bandage, and temporary body art formulation (e.g., temporary tattoos), to name a few.

Experimental Examples

Experimental examples were conducted and the results are discussed below.
Sample Preparation
Sample preparation generally included the following steps. First, sulfonated polyester beads were added to water on a magnetic stir plate/hot plate. The resulting mixture was heated to at least about 45° C. while stirring at about 100 rotations per minute (rpm) for about 60 minutes or longer as needed to achieve a stable dispersion with a zeta potential of 30 mV or less. Samples including Eastman™ AQ55 were heated to temperatures of about 60° C.

Next, the mixture was removed from the hot plate/stir plate and hydrolyzed cellulose nanocrystals (CNCs) were added gradually, aided by periodic stirring with a spatula to promote incorporation of the CNC. In some experiments, FeO pigment particles were then added and stirred with a spatula (the magnetic stir bar was removed before adding the FeO pigment particles).

Viscosity Experiments

In a set of experiments, various mixtures were prepared and tested to ascertain the impacts of hydrolyzed cellulose nanocrystal and sulfonated polyester content on the viscosity of aqueous mixtures. Certain test samples were compared to commercially available products.

Each test mixture was tested at room temperature and ambient conditions. Rheological data were obtained using a rotational rheometer (Discovery Series Hybrid Rheometer (DHR)-3 from TA Instruments, New Castle, Delaware). The rheometer was fixed with a parallel plate test geometry (aluminum plates with 40 mm diameter), and the gap was set to 1 mm. A sample size of 1.26 mL was used for each test mixture.

Pre-shearing was performed for 10 seconds at a rate of 2 $s^{-1}$ with a 2-minute rest period before initial testing. A shear rate sweep was used beginning with high shear rates. Steady-state sensing was used with a 12-minute maximum equilibration time per shear rate for the sample to achieve a steady state viscosity value.

FIG. 1 shows viscosity profiles for an aqueous mixture including 15 wt % sulfonated polyester (Eastman™ AQ38), 10 wt % CNC, and 2 wt % FeO pigment. It was observed that the experimental sample fell within the range of three different commercially-available mascaras.

Figure 2:
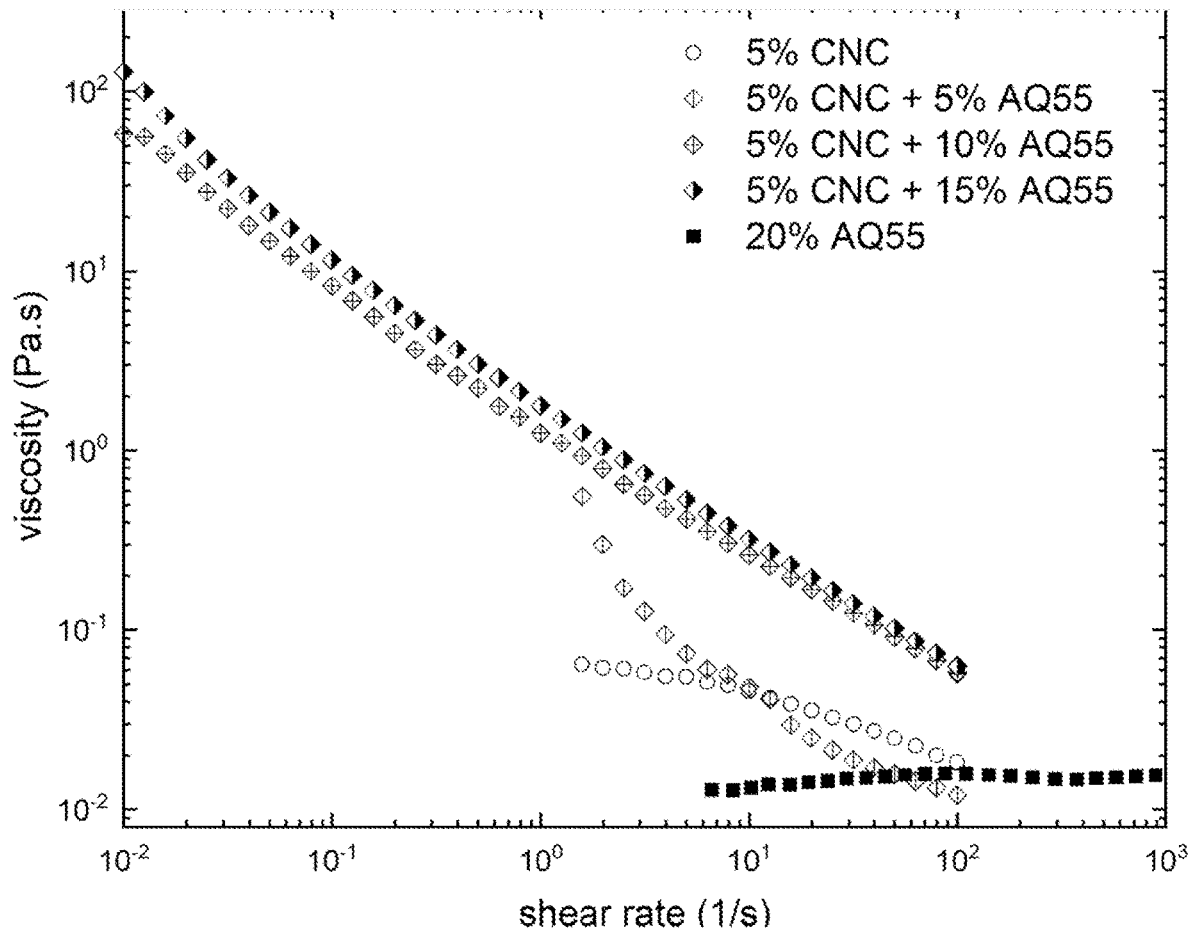
FIG. 2 shows experimental data for viscosity of several aqueous mixtures varying in sulfonated polyester content and CNC content at selected shear rates.

FIG. 2 shows viscosity profiles for five different compositions, namely, aqueous mixtures including 5 wt % CNC; 5 wt % CNC and 5 wt % sulfonated polyester (Eastman™ AQ55); 5 wt % CNC and 10 wt % sulfonated polyester (Eastman™ AQ55); 5 wt % CNC and 15 wt % sulfonated polyester (Eastman™ AQ55); and 25 wt % sulfonated polyester (Eastman™ AQ55). None of these tested samples included pigment, such as FeO. Based on the data shown in FIG. 2, it appears that there is a critical loading of sulfonated polyester (which can vary depending on CNC loading), above which the rheology changes significantly (in this case, between 5 wt % and 10% wt % sulfonated polyester).

Figure 3:
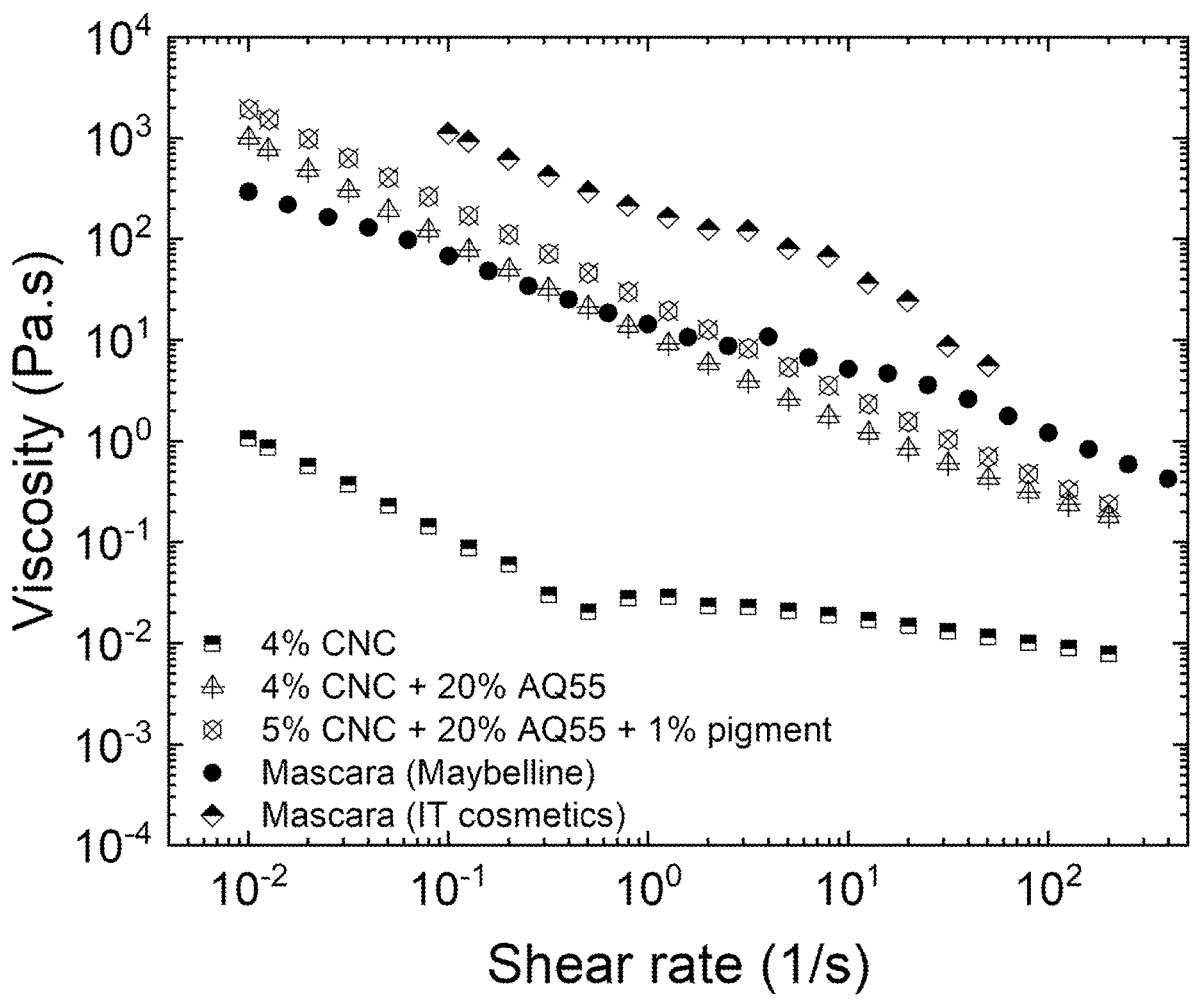
FIG. 3 shows experimental data for viscosity of several aqueous mixtures varying in sulfonated polyester content and CNC content, and comparing to commercially-available mascaras, at selected shear rates.

FIG. 3 shows viscosity profiles for five different compositions, namely, aqueous mixtures including 4 wt % CNC; 4 wt % CNC and 20 wt % sulfonated polyester (Eastman™ AQ55); and 4 wt % CNC, 20 wt % sulfonated polyester (Eastman™ AQ55), and 1 wt % FeO pigment. Commercially available mascaras from IT cosmetics and Maybelline were also tested. It was observed that pigment has a negligible effect on viscosity for the tested compositions.

Figure 4:
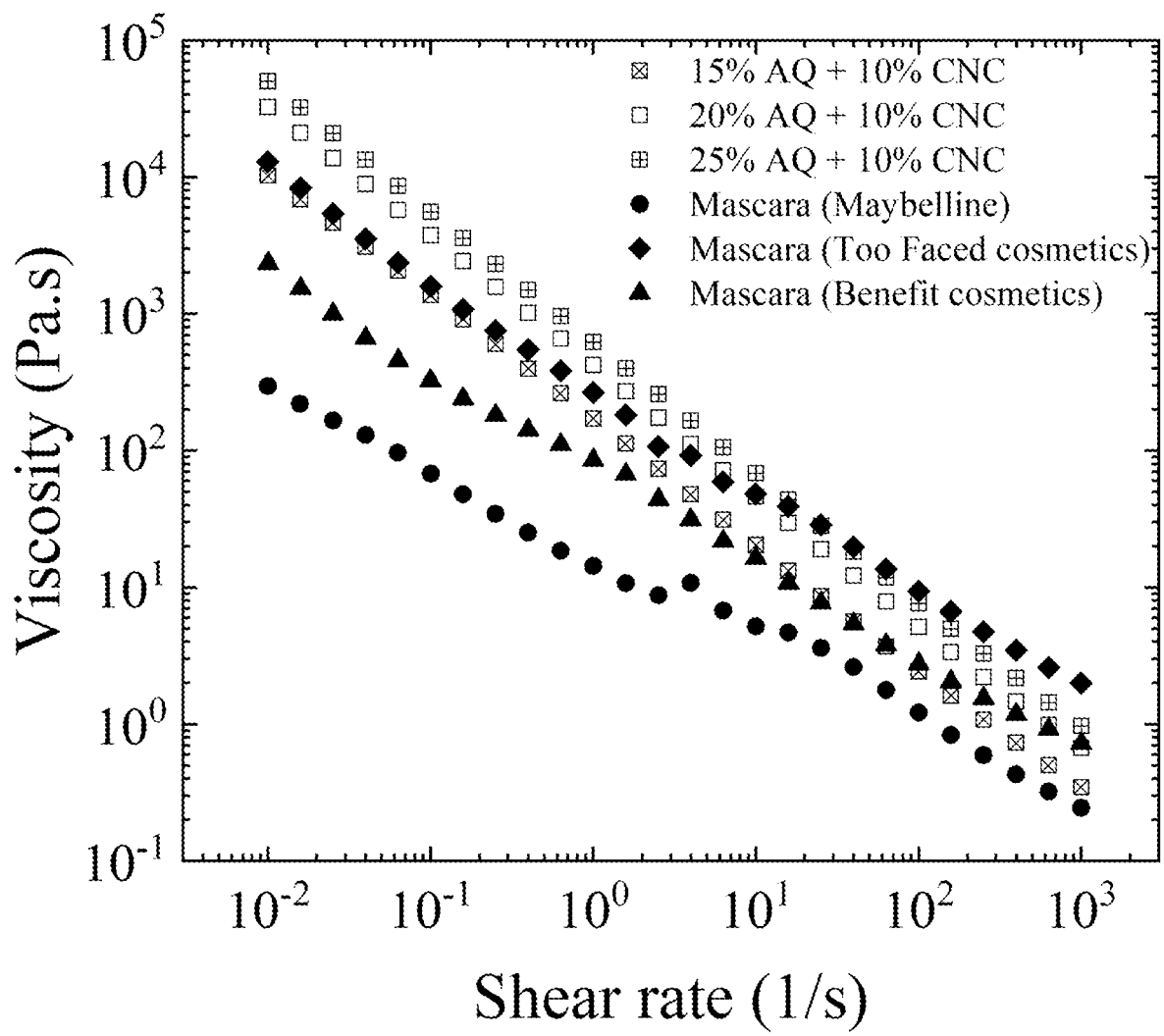
FIG. 4 shows experimental data for viscosity of several aqueous mixtures varying in sulfonated polyester content, and comparing to commercially-available mascaras, at selected shear rates.

FIG. 4 shows viscosity profiles for six different compositions, namely, aqueous mixtures including 10 wt % CNC and 15 wt % sulfonated polyester (Eastman™ AQ38); 10 wt % CNC and 20 wt % sulfonated polyester (Eastman™ AQ38); and 10 wt % CNC and 25 wt % sulfonated polyester (Eastman™ AQ38). Each of these compositions included 2 wt % FeO. Commercially available mascaras from Maybelline, Too Faced cosmetics, and Benefit cosmetics were also tested. It was observed that increasing sulfonated polyester content, without decreasing CNC content, can cause the viscosity of the aqueous mixtures to increase.

Figure 5:
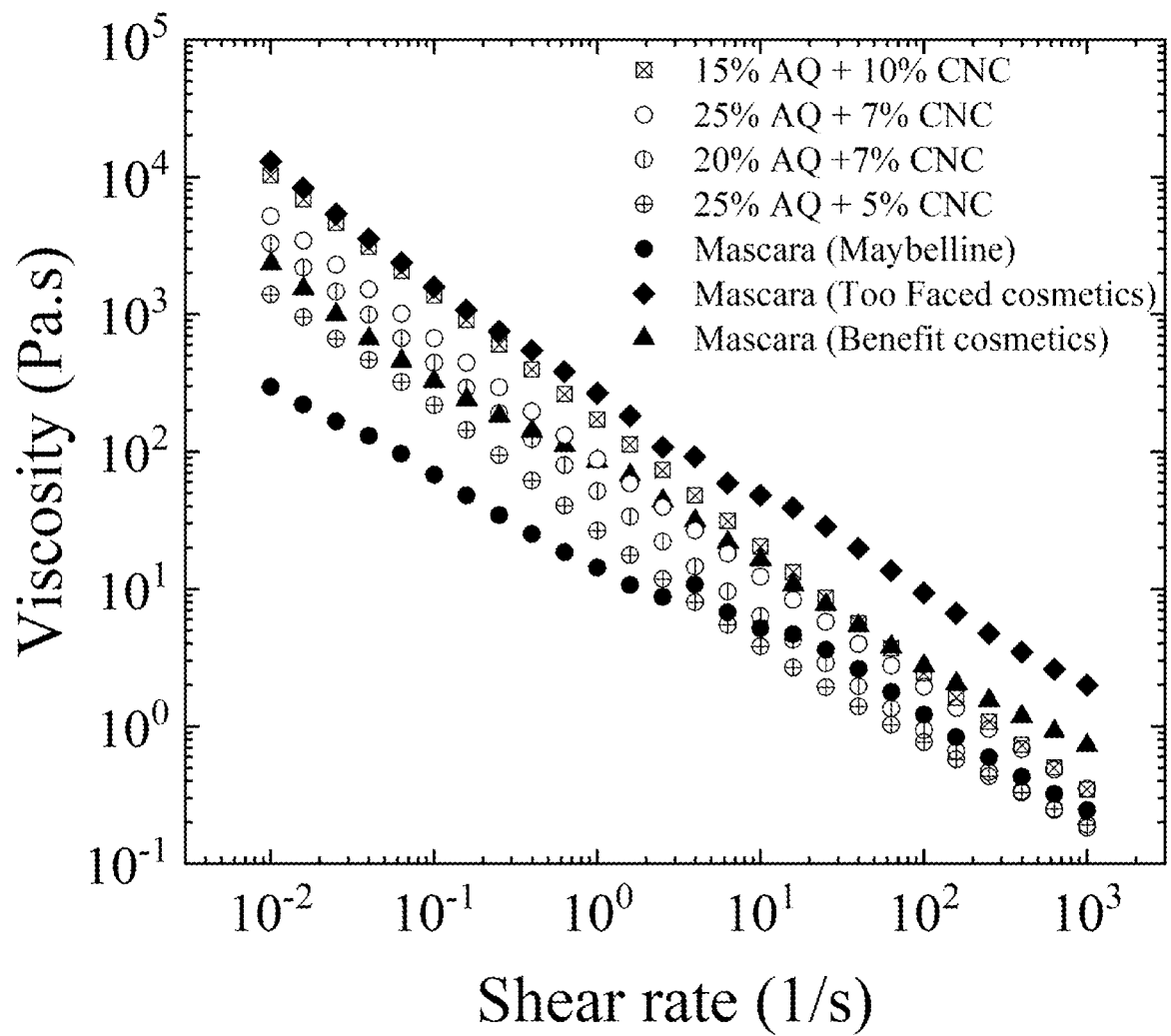
FIG. 5 shows experimental data for viscosity of several aqueous mixtures varying in sulfonated polyester content and CNC content, and comparing to commercially-available mascaras, at selected shear rates.

FIG. 5 shows viscosity profiles for seven different compositions, namely, aqueous mixtures including 10 wt % CNC and 15 wt % sulfonated polyester (Eastman™ AQ38); 7 wt % CNC and 25 wt % sulfonated polyester (Eastman™ AQ38); 7 wt % CNC and 20 wt % sulfonated polyester (Eastman™ AQ38); and 5 wt % CNC and 25 wt % sulfonated polyester (Eastman™ AQ38). Each of these compositions included 2 wt % FeO. Commercially available mascaras from Maybelline, Too Faced cosmetics, and Benefit cosmetics were also tested. It was observed that, compared to an aqueous mixture with 10 wt % CNC and 15 wt % sulfonated polyester, decreasing CNC content and increasing sulfonated polyester content reduces viscosity of the aqueous mixtures.

Coated False Eyelashes

In a set of experiments, various mixtures were prepared and applied to false eyelashes. Then optical microscopy was used to obtain images of the coated false eyelashes. In particular, the coatings were applied onto the false eyelashes using a disposable mascara wand (4 to 5 strokes) and then dried at room temperature. Then the coated false eyelashes were glued onto glass substrates and placed under an Olympus BX-61 microscope for imaging.

FIG. 6A-FIG. 6D are optical microscopy images of false eyelashes coated with an exemplary aqueous mixture before and after abrasion testing. The exemplary aqueous mixture included 10 wt % CNC, 15 wt % sulfonated polyester (Eastman™ AQ38), and 2 wt % FeO. Abrasion testing was performed by rubbing the coated false eyelashes with a Kimwipe. FIG. 6A and FIG. 6B show the coated false eyelashes before abrasion/smudge testing. FIG. 6C and FIG. 6D show the coated false eyelashes after abrasion/smudge testing. It was observed that the coating was maintained on the eyelashes, showing smudge-proof performance.

FIGS. 7A and 7B are optical microscopy images of false eyelashes coated with an exemplary aqueous mixture before and after, respectively, exposure to water. The exemplary aqueous mixture included 10 wt % CNC, 15 wt % sulfonated polyester (Eastman™ AQ38), and 2 wt % FeO. Water resistance testing was performed by rubbing the coated false eyelashes with a Kimwipe damped with 20-25° C. tap water. It was observed that the coating was maintained on the eyelashes, showing waterproof performance.

FIGS. 8A and 8B are optical microscopy images of false eyelashes coated with an exemplary aqueous mixture before and after, respectively, exposure to warm water. The exemplary aqueous mixture included 10 wt % CNC, 15 wt % sulfonated polyester (Eastman™ AQ38), and 2 wt % FeO. Removal testing in water was performed by soaking the coated false eyelashes in 60° C. tap water and gently washing the coated false eyelashes for at least 30 seconds. Then the false eyelashes were dried at room temperature before imaging. It was observed that the coating was removed from the eyelashes, demonstrating controlled removal of the coating.

Coating Drying Time

Drying time of an exemplary aqueous mixture was also experimentally evaluated. At room temperature, a goose feather was coated with an exemplary aqueous mixture and cut into four pieces. The exemplary aqueous mixture included 10 wt % CNC, 15 wt % sulfonated polyester (Eastman™ AQ38), and 2 wt % FeO. After a given period of time, the coated feather was pressed down and brushed onto background paper to check for smudging. When no residue was left on the background paper, it was concluded that the coating was dried.

Figure 9:
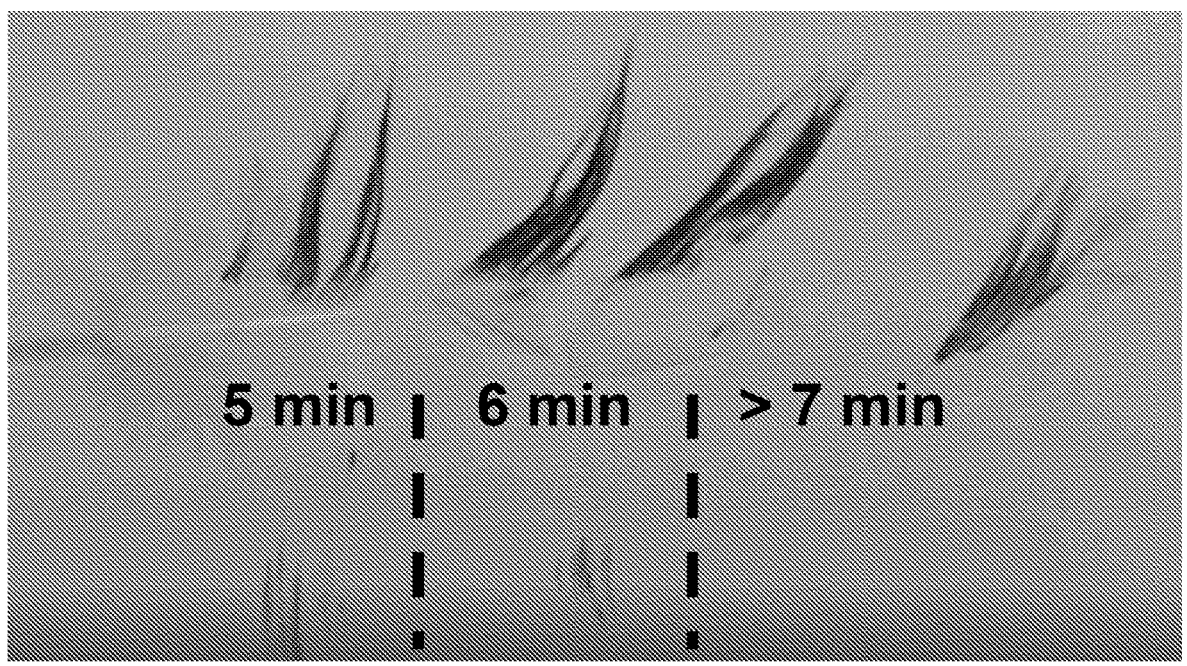
FIG. 9 is a photograph showing results of drying tests where a goose feather was coated with an exemplary aqueous mixture.

FIG. 9 shows photographic results of these tests. In particular, FIG. 9 shows coated goose feather after 5 minutes of drying time, after 6 minutes of drying time, and after more than 7 minutes of drying time. It was observed that the coating was dry after 10 minutes.

Contact Angle

Contact angle measurements were performed for coated hair extensions. For the tests, a First Ten Angstroms 1000B Goniometer was used at room temperature. Exemplary aqueous mixtures were coated onto hair extensions and placed flat onto glass substrate. After the coating was dried, the contact angle was measured to check for hydrophobicity of the coating.

Figure 10:
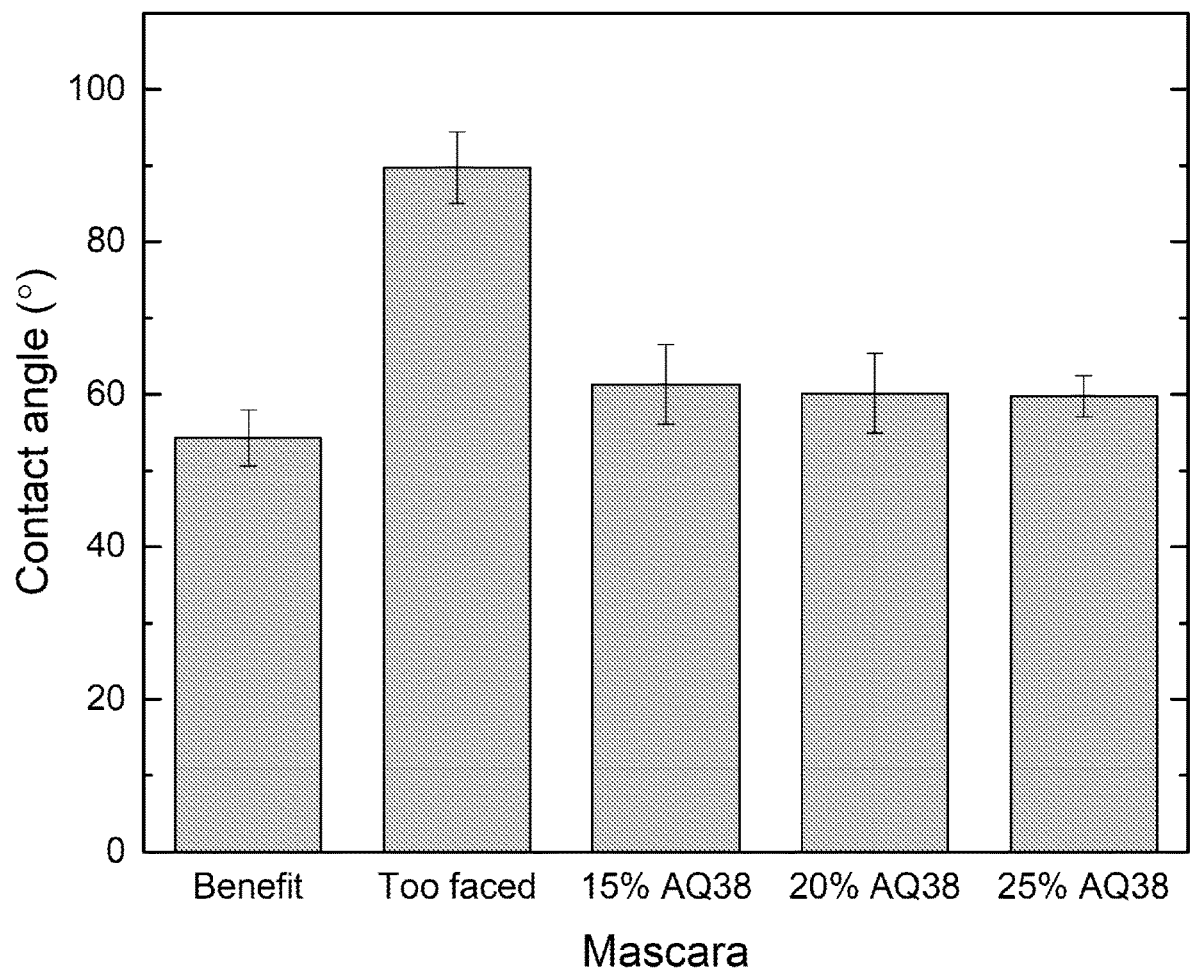
FIG. 10 shows experimental contact angle measurement results for exemplary aqueous mixtures compared to commercially-available mascaras.

FIG. 10 shows experimental contact angle results for exemplary aqueous mixtures including 15 wt % sulfonated polyester (Eastman™ AQ38), 10 wt % CNC, and 2 wt % FeO; 20 wt % sulfonated polyester (Eastman™ AQ38), 10 wt % CNC, and 2 wt % FeO; and 25 wt % sulfonated polyester (Eastman™ AQ38), 10 wt % CNC, and 2 wt % FeO. Also tested were commercially-available mascaras Benefit from Benefit Cosmetics (California, United States) and Too Faced mascara from Too Faced Cosmetics, LLC (California, United States). The contact angles of the exemplary aqueous mixtures, shown in FIG. 10, appear comparable to the commercially-available mascaras. Intervals shown on FIG. 10 are the standard deviations for each respective data set.

Gravimetric Analysis of Application and Removal

Gravimetric analysis was performed for application and removal of exemplary aqueous mixtures. Three sample compositions were applied to false eyelashes: 15 wt % sulfonated polyester (Eastman™ AQ38), 10 wt % CNC, and 2 wt % FeO; 20 wt % sulfonated polyester (Eastman™ AQ38), 10 wt % CNC, and 2 wt % FeO; and 20 wt % sulfonated polyester (Eastman™ AQ38), 10 wt % CNC, and 2 wt % FeO. To confirm that the exemplary coatings were fully removed by warm water, the false eyelashes were weighed before applying the coating, after applying the coating, and after removal of the coating and subsequent blotting to remove excess water (and ensure the eyelashes were fully dried). It was observed that using 55° C. water removed the coating from the false eyelashes. Additional data are shown in Table 1, below.

TABLE 1

Gravimetric analysis of application and removal. The coating is fully removed by water at 55° C.

| Composition | Weight before application | Weight after application | Weight after removal |
|---|---|---|---|
| 15 wt % AQ38 10 wt % CNC 2 wt % FeO | 19.0 mg | 31.4 mg | 19.1 mg |
| 20 wt % AQ38 10 wt % CNC 2 wt % FeO | 20.7 mg | 36.6 mg | 20.9 mg |
| 25 wt % AQ38 10 wt % CNC 2 wt % FeO | 24.2 mg | 33.6 mg | 24.3 mg |

Non-Cellulose Nanocrystal Thickener

Figure 11:
FIG. 11 is a photograph of a mixture including a non-CNC thickener, gum Arabic, sulfonated polyester, and pigment.

A sample was prepared using gum Arabic in place of CNC. More specifically, a composition was prepared with 10 wt % gum Arabic (also referred to as acacia gum or acacia Senegal gum), 15 wt % sulfonated polyester (Eastman™ AQ38), and 2 wt % FeO pigment in water. FIG. 11 is a photograph of the resulting mixture. It was observed that the gum Arabic aggregates and does not mix with the sulfonated polyester. It was also observed that the FeO pigment settled to the bottom of the mixture because of insufficient suspension viscosity.

It is understood that the foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. An aqueous mixture, comprising:
    5% by weight (wt %) to 20% cellulose nanocrystals; and
    10 wt % to 30 wt % sulfonated polyester having a glass transition temperature ($T_g$) greater than 25° C.,
    wherein a viscosity of the aqueous mixture is between $10^3$ Pa·s and $10^5$ Pa·s at a shear rate of 0.01 s$^{-1}$.

2. The aqueous mixture according to claim 1, wherein the cellulose nanocrystals are present in the aqueous mixture at about 8% by weight to about 15% by weight.

3. The aqueous mixture according to claim 1, wherein the cellulose nanocrystals have an average length of about 100 nm to about 200 nm and an average width of about 5 nm to about 20 nm.

4. The aqueous mixture according to claim 1, wherein the cellulose nanocrystals are anionic.

5. The aqueous mixture according to claim 1, wherein the cellulose nanocrystals are non-ionic.

6. The aqueous mixture according to claim 1, further comprising at least one additive, the at least one additive being a vitamin, a pharmaceutical agent, reinforcement particles, or pigment particles.

7. The aqueous mixture according to claim 6, wherein the at least one additive comprises reinforcement particles or pigment particles; and
    wherein the at least one additive is present in the aqueous mixture at about 1.5% by weight to about 2.5% by weight.

8. The aqueous mixture according to claim 7, wherein the at least one additive comprises FeO; and
    wherein a contact angle of the aqueous mixture is between about 50° and about 68° when coated onto a substrate.

9. The aqueous mixture according to claim 1, wherein the glass transition temperature ($T_g$) of the sulfonated polyester is between about 35° C. and about 65° C.

10. A method for making an aqueous mixture, the method comprising:
    combining sulfonated polyester and cellulose nanocrystals in an aqueous medium to form the aqueous mixture, wherein the aqueous mixture comprises:
    5% by weight (wt %) to 20% cellulose nanocrystals; and
    10 wt % to 30 wt % sulfonated polyester having a glass transition temperature (To) greater than 25° C.,
    wherein a viscosity of the aqueous mixture is between $10^3$ Pa·s and $10^5$ Pa·s at a shear rate of 0.01 s$^{-1}$.

11. The method according to claim 10, wherein the sulfonated polyester is mixed in the aqueous medium before dispersing the cellulose nanocrystals.

12. The method according to claim 10, further comprising adding an additive into the aqueous mixture, the additive being a vitamin, a pharmaceutical agent, reinforcement particles, or pigment particles.

13. The method according to claim 10, wherein combining the sulfonated polyester in the aqueous medium occurs at a temperature of about 25° C. to about 85° C.

14. The method according to claim 10, wherein combining the sulfonated polyester in the aqueous medium includes mixing for about 45 minutes to about 90 minutes.

15. A personal care product, cosmetic or household product comprising the aqueous mixture of claim 1.

16. A hair colorant/fixative, lip color product, facial foundation or temporary body art formulation comprising the aqueous mixture of claim 1.

17. A mascara comprising the aqueous mixture of claim 1.

* * * * *